United States Patent
Buehler et al.

(10) Patent No.: US 7,992,891 B2
(45) Date of Patent: Aug. 9, 2011

(54) INTERIOR PANELLING PART FOR COVERING AN AIRBAG AND METHOD FOR PRODUCTION THEREOF

(75) Inventors: Wolfram Buehler, Karlsruhe (DE);
Wolf-Dieter Schaedel, St. Wendel (DE);
Gordon Schweizer, Rheinzabern (DE);
Buelent Kalkan, Woerth (DE); Frank Bauer, Landau-Nussdorf (DE); Christo Gavrilov, München (DE)

(73) Assignees: Faurecia Innenraum Systeme GmbH, Hagenbach (DE); Moldware Konstruktion Produktentwicklung Design GmbH, St. Wendel (DE)

( * ) Notice: Subject to any disclaimer, the term of this patent is extended or adjusted under 35 U.S.C. 154(b) by 86 days.

(21) Appl. No.: 12/295,974

(22) PCT Filed: Apr. 3, 2007

(86) PCT No.: PCT/EP2007/003297
§ 371 (c)(1),
(2), (4) Date: Mar. 18, 2009

(87) PCT Pub. No.: WO2007/115835
PCT Pub. Date: Oct. 18, 2007

(65) Prior Publication Data
US 2009/0273164 A1 Nov. 5, 2009

(30) Foreign Application Priority Data
Apr. 4, 2006 (DE) .......................... 10 2006 016 724

(51) Int. Cl.
*B60R 21/16* (2006.01)
(52) U.S. Cl. ..................................... 280/728.3; 280/732
(58) Field of Classification Search ............... 280/728.3, 280/732
See application file for complete search history.

(56) References Cited

U.S. PATENT DOCUMENTS

| | | | |
|---|---|---|---|
| 5,382,047 A | 1/1995 | Gajewski | |
| 5,431,435 A | 7/1995 | Wilson | |
| 6,129,378 A * | 10/2000 | Goto et al. | 280/732 |
| 6,655,711 B1 | 12/2003 | Labrie et al. | |
| 7,478,827 B2 * | 1/2009 | Thomas et al. | 280/728.3 |

FOREIGN PATENT DOCUMENTS

| | | |
|---|---|---|
| DE | 200 15 135 | 2/2001 |
| DE | 101 47 547 | 4/2003 |
| DE | 102 03 407 | 8/2003 |
| DE | 103 45 026 | 5/2005 |
| WO | 03/029055 | 4/2003 |
| WO | 2005/030537 | 4/2005 |

* cited by examiner

*Primary Examiner* — Eric Culbreth
(74) *Attorney, Agent, or Firm* — Fay Kaplun & Marcin, LLP

(57) ABSTRACT

An interior panelling part for covering an airbag has a sheet-like support, a decorative layer and an intermediate layer arranged between the support and the decorative layer. A passage opening for the airbag is left open in the support. The intermediate layer comprises a mat which spans the passage opening and overlaps with the support outside the passage opening. The intermediate layer and/or the decorative layer is/are weakened longitudinally or offset parallel to an edge of the passage opening on just one side of the passage opening.

16 Claims, 2 Drawing Sheets

INTERIOR PANELLING PART FOR COVERING AN AIRBAG AND METHOD FOR PRODUCTION THEREOF

FIELD OF INVENTION

The invention relates to an interior panelling part for covering an airbag having a flat support, a decorative layer and an intermediate layer which is disposed between the support and the decorative layer wherein a passage opening for the airbag is left open in the support, the intermediate layer including a mat which spans the passage opening and overlaps with the support. The invention also relates to a method for the production of such an interior panelling part.

BACKGROUND INFORMATION

Generic interior panelling parts, in which a passage opening for the airbag is left open in the support, the intermediate layer comprising a mat which spans the passage opening and overlaps with the support outside of the passage opening, are known for example from the publication DE 103 45 026 A1. These interior panelling parts according to the state of the art are typically provided with a weak point of the intermediate layer and/or of the decorative layer on three sides of the passage opening so that the intermediate layer and the decorative layer tears and can open up along an edge of the passage opening at these three sides when the airbag deploys, the mat assuming the function of a hinge. In particular if such an interior panelling part is disposed behind a windscreen for covering a passenger airbag, the problem arises in embodiments according to the state of the art that an opening part of the interior panelling part strikes against the windscreen with great force and damages the latter, which in turn involves an unnecessarily high degree of damage and a dangerous shower of airborne particles.

SUMMARY OF INVENTION

The present invention relates to an interior panelling part for covering an airbag, with which the portrayed disadvantage is avoided, with which it is therefore possible to prevent energy which is released when the airbag deploys from leading to destruction or damage to the windscreen or to another window disposed in the vicinity of the interior panelling part. Furthermore, the object underlying the invention is to develop a method for the production of a corresponding interior panelling part.

This object is achieved according to the invention by an interior panelling part for covering an airbag, comprising: a flat support; a decorative layer; and an intermediate layer disposed between the support and the decorative layer, wherein a passage opening for the airbag is left open in the support, the intermediate layer including a mat which spans the passage opening and overlaps with the support outside of the passage opening, and wherein at least one of the intermediate layer and the decorative layer is weakened at one and only one side of the passage opening along one edge of the passage opening. This object is also achieved by a method for a production of an interior panelling part, comprising: disposing a decorative layer of the part and a flat support of the part in a rear-foaming tool, the part further comprising an intermediate layer which includes a mat; introducing the mat with a sealing layer which is placed behind it into a cavity between the decorative layer and the support such that the passage opening is covered; and after the introducing step, filling the cavity by rear-foaming of the decorative layer, wherein a passage opening is left open in the support, the mat spanning the passage opening and overlapping with the support outside of the passage opening, and wherein at least one of the intermediate layer and the decorative layer is weakened at one and only one side of the passage opening along one edge of the passage opening. Advantageous embodiments and developments are revealed in the features of the sub-claims.

As a result of the fact that the intermediate layer and/or the decorative layer is weakened according to the invention at precisely one side of the passage opening along or offset parallel to an edge of the passage opening, it is achieved that a part of the interior panelling part which is formed from the intermediate layer with the mat and the decorative layer and covers the airbag does not open completely when the airbag is triggered but rather opens in the manner of a pocket or the mouth of a fish and thereby releases an opening from which the airbag can unfold, the airbag being guided through the mentioned part of the interior panelling part. Consequently, it becomes possible in particular to guide an opening movement of the airbag and possibly to divert the direction of a movement of the airbag such that contact of an airbag cover which is formed by the mentioned part of the interior panelling part or of the airbag itself with a window disposed in the immediate vicinity is prevented or slowed down such that damage to the window is avoided. The pocket-like or fish mouth-like opening of the airbag cover is thereby ensured in that both the intermediate layer and the decorative layer are not weakened on a side which is situated opposite the mentioned side of the passage opening and also on two further oppositely situated sides. The edge of the passage opening, along which the intermediate layer and/or the decorative layer is weakened at precisely one side of the passage opening, has a straight or essentially straight course there in typical embodiments of the invention.

A typical arrangement of an interior panelling part of the type proposed here provides that the side of the passage opening on which the intermediate layer and/or the decorative layer is weakened, is orientated away from a windscreen or from another window of a vehicle situated in the immediate vicinity of the passage opening. The interior panelling part can concern in particular an instrument panel or a part of an instrument panel. The airbag covered by the interior panelling part typically concerns a passenger airbag. Alternatively, this can also for example concern an interior panelling part which covers a knee airbag or door-side airbag.

In order to ensure that an edge of the airbag cover tears only at the weakened side, in order that the interior panelling part can effect guidance or diversion of the opening airbag in the described manner, the mat can be mounted outside of the passage opening on a side which is situated opposite the side with the weak point and/or on two further oppositely situated sides of the passage opening on the support, for example by means of a screw, rivet or adhesive connection, or by ultrasonic welding. A preferred embodiment of the invention provides correspondingly that the mat is connected to the support respectively along a stretch which is parallel to an edge of the passage opening on the respective side, for example is screwed, riveted or glued to the support.

At the sides of the passage opening at which no weak point is provided, the intermediate layer and the decorative layer are subjected to high loads when an airbag is triggered. In order to ensure a high loading capacity of the airbag cover which is sufficient for these loads, the mat can be designed with such dimensions that, wherever the intermediate layer and the decorative layer are not weakened along the edge of the passage opening, it covers a strip of the support which is at least 1 cm wide, particularly preferred at least 2 cm wide, particularly preferred at least 5 cm wide and extends parallel to the edge of the passage opening. If this strip which forms an overlap region of the mat with the support is sufficiently wide, a separate mounting of the mat on the support can also possibly be dispensed with.

A preferred embodiment of the invention provides that the intermediate layer comprises a foamed material which connects the decorative layer to the support and into which the mat is inserted, this preferably again concerning in particular a polyurethane foam. Consequently, both a high configuration clearance with respect to shape and tactile qualities of a foam side of the interior panelling part and formation of an advantageously flexible and load-bearing composite of decorative layer and intermediate layer, forming the airbag cover, can be achieved. Advantageously, the mat can be penetrated for this purpose at least partially, preferably completely, by the foamed material.

In order that a pocket- or fish mouth-like opening of the airbag cover and consequently guidance and possibly diversion of the opening airbag is possible whilst most extensively avoiding an undesired shower of airborne particles, a composite which is formed from the decorative layer and the intermediate layer with the mat and forms the airbag cover should be as flexible, extensible and loadable in a tensile manner as possible. In order to achieve that, subsequently listed features in particular can be achieved.

The mat can be manufactured advantageously from polyester, polyamide or other synthetic or natural fibre materials. Also other materials can be used with a breaking elongation (subsequently also extensibility) of at least 40%, preferably with a breaking elongation of at least 200%. The mat can thereby be designed preferably with a strength which leads to a tensile strength of at least 1 MPa, preferably to a tensile strength of between 1 MPa and 5 MPa. In order to be able to achieve a sufficiently high extensibility and, at the same time, to be able to transmit the forces required for guidance of the airbag through the mat, a material which forms the mat should have a modulus of elasticity of between 1 MPa and 5 MPa.

The decorative layer should also be configured to be as flexible and loadable as possible, an aesthetic configuration of the decorative layer being intended to be possible at the same time. This can be achieved by manufacturing the decorative layer from a material which contains PVC (polyvinyl chloride), TPU (thermoplastic polyurethane), TPO (thermoplastic polyolefin), leather and/or synthetic leather. Also the decorative layer can have, as a result of a corresponding choice of material, an elasticity of at least 250%, preferably an extensibility of at least 300%, in preferred embodiments of the invention. A material which forms the decorative layer should in turn have a modulus of elasticity of preferably between 5 MPa and 15 MPa with respect to high extensibility and loading capacity. In order that the decorative layer can assume a reasonable part of a tensile force to be transmitted from the airbag cover when the airbag deploys, the decorative layer can be configured with a strength which leads to a tensile strength of the decorative layer of at least 5 MPa, preferably to a tensile strength of the decorative layer of between 5 MPa and 15 MPa.

In particular, the mat can have a thickness of between 2 mm and 10 mm and/or the decorative layer a thickness of between 0.1 mm and 2.5 mm in order that favourable extensibility and loading capacity of the airbag cover is achieved.

In preferred embodiments of the invention, the decorative layer forms with the intermediate layer a composite which has an extensibility of at least 40%, preferably an extensibility of at least 150%, and/or a tensile strength of at least 2 MPa, preferably a tensile strength of at least 2 MPa and 15 MPa. The modulus of elasticity is preferably in the range of 10 and 70 MPa, the thickness of the composite in the range of 3 mm and 15 mm.

In order to permit easier production of the interior panelling part, the mat can be backed with a sealing layer, preferably a foil, which is placed on the support and can be glued there and covers the passage opening in the support.

An advantageous method for the production of an interior panelling part of the described type provides that the decorative layer and the support are disposed in a rear-foaming tool and the mat is introduced with a sealing layer which is placed behind it into a cavity between the decorative layer and the support such that the passage opening is covered, after which the cavity is filled by rear-foaming of the decorative layer. It can be provided that the intermediate layer and/or the decorative layer are provided subsequently at precisely one side of the passage opening with a weak point which extends along the edge of the passage opening. The step of rear-foaming of the decorative layer involves applying foam onto a rear side of the decorative layer.

A weak point of the intermediate layer, provided according to the invention, can already be produced possibly however in that the mat ends at the corresponding side of the passage opening at the edge of the passage opening and has itself there an edge which extends parallel to the edge of the passage opening. Alternatively, the mat can be configured on the corresponding side of the passage opening perforated along the edge of the passage opening. In every case, the weak point of the intermediate layer and/or of the decorative layer should be designed such that the interior panelling part has a predetermined tearing line on precisely one side of the passage opening, whereas all the layers of the interior panelling part on all remaining sides and in particular on two oppositely situated sides which abut against the weakened side are so stable that tearing is prevented there even with the forces associated with airbag triggering. In order to prevent undesired additional lateral tearing of the airbag cover, the predetermined tearing line formed by the weak point can also have a course bent away from the passage opening at two ends.

BRIEF DESCRIPTION OF DRAWINGS

An embodiment of the invention is described subsequently with reference to FIGS. 1 to 3. There are shown FIG. 1 a plan view on an interior panelling part according to the invention, omitting a decorative layer, FIG. 2 a longitudinal section through the same interior panelling part and FIG. 3 a cross-section of this interior panelling part.

DETAILED DESCRIPTION

Figure 1:
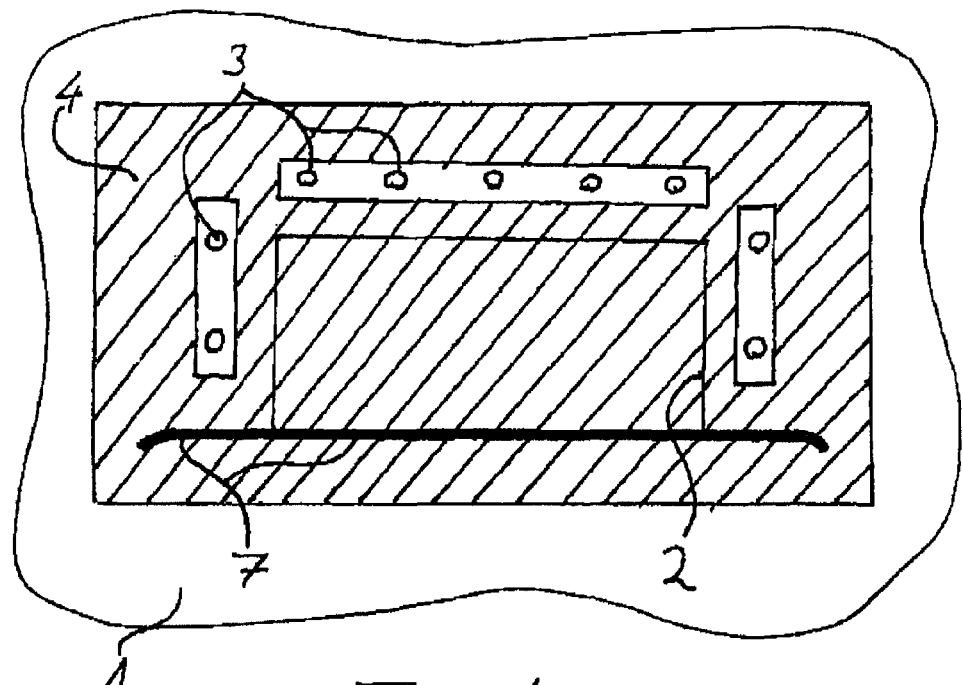

The interior panelling part represented in FIG. 1 concerns an instrument panel, an illustrated part of this instrument panel being intended to serve for covering a passenger airbag. Alternatively, an internal panelling part for example which covers a knee airbag or door-side airbag would also be possible. The interior panelling part has a flat support 1 which is manufactured from a fibre-reinforced polypropylene-containing plastic material. Basically, the support can comprise also other materials, in particular a non-reinforced plastic material or one reinforced with natural or synthetic fillers, such as PP (polypropylene), or SMA (styrene maleic anhydride). This support 1 has a rectangular passage opening 2 in the present example for the passenger airbag. A mat 4 which covers the passage opening 2 and is mounted on the support 1 with rivets 3 is disposed on the support and overlaps with the support 1 outside of the passage opening 2. This mat 4 is inserted in a polyurethane foam which completely penetrates the mat 4 and with which it forms an intermediate layer of the interior panelling part. The mat 4 is manufactured from a fibre material comprising polyester, here in the form of a knitted fabric, and has a thickness of approx. 6 mm. The mat 4 thereby has a modulus of elasticity longitudinally of approx. 2 MPa and transversely of approx. 1 MPa, a breaking elongation longitudinally of approx. 220% and transversely of approx. 50% and a tensile strength longitudinally of approx. 4.2 MPa and transversely of approx. 1.4 MPa. Alternatively, the mat can also be manufactured from other materials, in particular from synthetic or natural fibre materials, in particular from polyamide.

Figure 2:
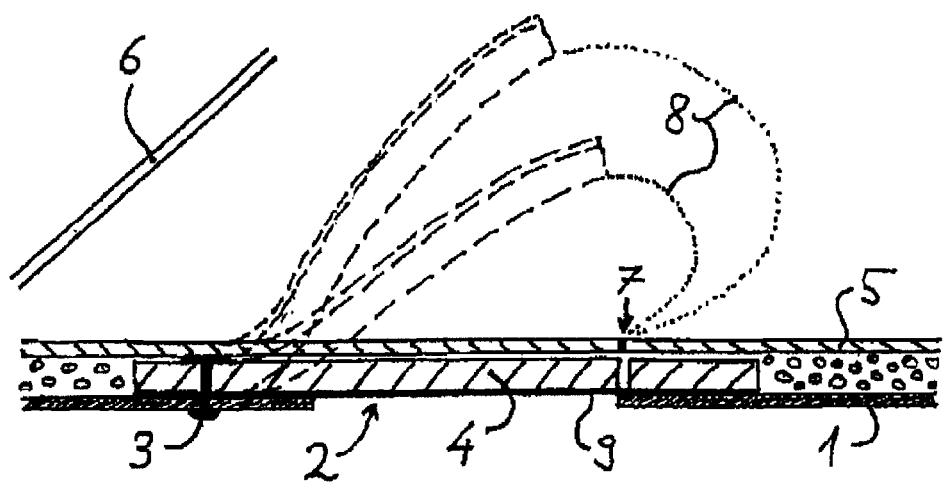
Figure 3:
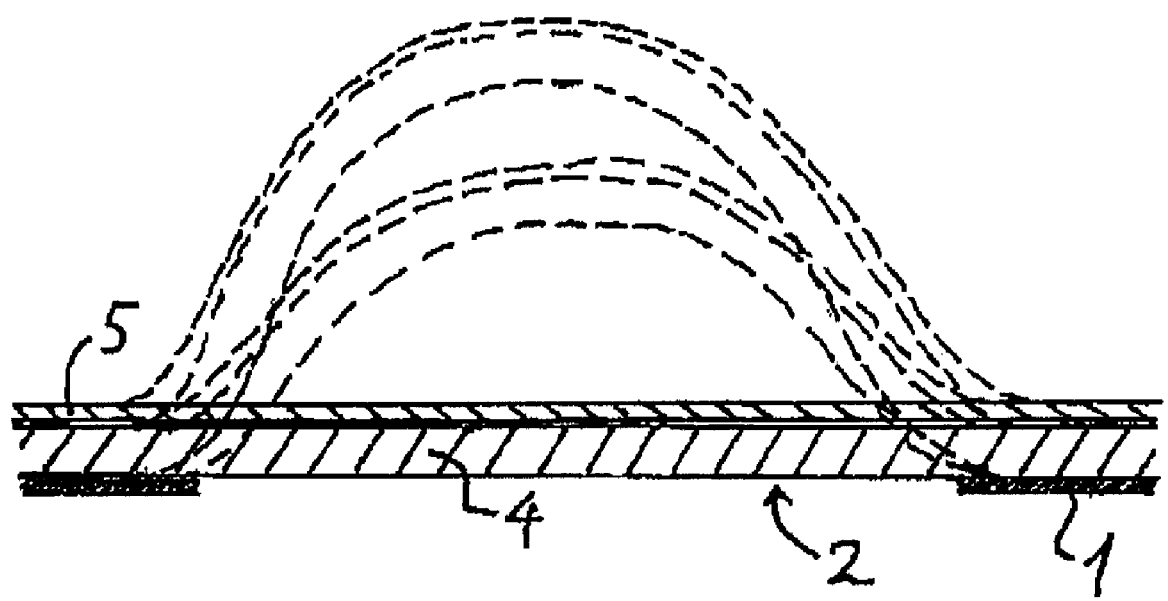

Above the intermediate layer which is formed by the mat 4 and the polyurethane foam, a decorative layer 5 of a thickness of approx. 1 mm which is illustrated only in FIGS. 2 and 3 is disposed. This decorative layer 5 is manufactured from PVC, has a tensile strength of approx. 11 MPa and an extensibility of approx. 300%. The decorative layer 5 thereby has a modulus of elasticity of approx. 14 MPa. In a region which is covered by the mat 4, the intermediate layer with the decorative layer 5 thus forms a composite which has an extensibility transversely and longitudinally of approx. 300% and a tensile strength longitudinally of approx. 5 MPa and transversely of approx. 2.3 MPa and also a modulus of elasticity longitudinally of 45 MPa and transversely of approx. 15 MPa. The density of the composite is approx. 250 g/l. The reason for this essentially is that a knitted fabric is used as mat 4. Hence it is possible in particular also to produce a light airbag flap. Fundamentally, there are hence possible for the mat according to the invention, in addition to a knitted fabric, also woven fabric, possibly also fleeces, made of fibre materials. With this the required strength can be achieved at an advantageous low density and low weight associated therewith.

In FIG. 2, a windscreen 6 can be seen behind which the interior panelling part is disposed. On a side of the passage opening 2 which is orientated away from the windscreen 6 and only there, the intermediate layer with the mat 4 and the decorative layer 5 is provided along an edge of the passage opening 2 with a weak point 7 which is produced by a reduction of material thickness of the decorative layer 5 and by a perforation of the mat 4. Alternatively, a weak point of the intermediate layer could also be achieved in that the mat 4 extends on this side of the passage opening 2 only up to the edge of the passage opening 2. Alternatively, also an embodiment without a weak point in the decorative layer is possible.

In the illustrated example, the weak point 7, as can be detected in FIG. 1, protrudes laterally slightly beyond the passage opening 2 and there is curved away slightly from the passage opening 2. It is crucial that the intermediate layer and the decorative layer 5 is not weakened on the three remaining sides of the passage opening 2, i.e. on a side of the passage opening 2 which is orientated towards the windscreen 6 and opposite the weak point 7, and laterally on two oppositely situated sides of the passage opening 2. As a result of the fact that the mat 4 there is connected respectively to the support 1 along a stretch parallel to an edge of the passage opening 2 by means of the rivets 3, it is thus ensured that an airbag cover which is formed by the decorative layer 5 and the intermediate layer with the mat 4 tears open only at the side situated opposite the windscreen 6 along the weak point 7 but not on the side orientated towards the windscreen 6 and laterally on sides abutting against the weak point 7. Also the mentioned feature, according to which the weak point 7 has a slightly curved course laterally of the passage opening 2, contributes to lateral tearing being prevented. Instead of a connection of the mat 4 to the support 1 by means of the rivets 3, also a corresponding screw connection could be provided or alternatively or additionally an adhesive connection or ultrasonic welding of the mat 4 to the support 1. On the three sides of the passage opening 2 at which the intermediate layer and the decorative layer 5 are not weakened, the mat 4 overlaps with the support 1 so far that it covers a strip which is between 1 to 10 cm wide and extends parallel to the edge of the passage opening 2 on the support 1. Alternatively, it could also be provided that the mat 4 covers the support 1 over the entire surface. Separate securing of the mat 4 on the support 1 could then possibly be dispensed with in addition.

It is now achieved by the portrayed features that the airbag cover, which is formed by a part of the decorative layer 5 and the intermediate layer with the mat 4 which cover the passage opening 2, opens in a manner illustrated in FIGS. 2 and 3 like a pocket or fish mouth and thereby guides an airbag 8 indicated in FIG. 2 and diverts an unfolding movement of the airbag 8 away from the windscreen 6 in the direction of a vehicle interior. FIG. 3 thereby shows a view in the direction of travel on a cross-section of the interior panelling part, FIG. 2 a longitudinal section of the same interior panelling part which is perpendicular thereto. Contact of the airbag cover itself or of the airbag 8 with the windscreen 6, by means of which the latter could be destroyed, is consequently avoided.

If the described interior panelling part is combined with an airbag device which provides different filling quantities of the airbag 8 as a function of the accident parameters detected, the airbag cover, as indicated in FIGS. 2 and 3 by two different configurations illustrated in broken lines, opens to a varying extent and correspondingly absorbs different quantities of energy from a corresponding opening thrust.

A method for the production of the interior panelling part described by FIGS. 1 to 3 provides that firstly the decorative layer 5 and the support 1 are disposed in a rear-foaming tool such that a cavity remains between the decorative layer 5 and the support 1, the mat 4 with a sealing layer 9 (a foil) which is situated at the rear thereof and indicated in FIG. 2 being introduced into the cavity between the decorative layer 5 and the support 1 so that the passage opening 2 is covered and sealed by the sealing layer 9. Subsequently, the cavity is filled by rear-foaming the decorative layer 5 with a polyurethane foam. Finally, the intermediate layer and the decorative layer 5 are provided on the rear side with the weak point 7. It can also be provided that the mat 4 is provided already before the rear-foaming of the decorative layer 5 with the weak point 7 provided by a perforation in the mat 4. Alternatively, the complete composite can be weakened after the foaming, for example with a laser. An embodiment without a decorative weak point is also possible.

Preferred embodiments of the invention described here provide that the intermediate layer and/or the decorative layer is weakened on the mentioned precisely one side of the passage opening along the edge of the passage opening such that a weak point line in the intermediate layer and/or in the decorative layer is congruent there with the edge. The weak point line can however also extend of course offset slightly parallel to this edge without the desired effect, as shown in the Figures, of a pocket-like or fish mouth-like opening being impaired. This applies in particular if the weak point line extends outside of the passage opening when the weak point line is offset in the direction of the passage opening relative to the mentioned edge. A parallel offset between the edge and the weak point line should however thereby be as far as possible no more than approx. 4 cm, preferably no more than 2 cm. Finally, it is also conceivable that the weak point line has a slightly varying spacing relative to the edge of the passage opening, i.e. extends not exactly parallel to the latter.

The invention claimed is:

1. An interior panelling part for covering an airbag, comprising:
   a flat support;
   a decorative layer; and
   an intermediate layer disposed between the support and the decorative layer,
   wherein a passage opening for the airbag is left open in the support, the intermediate layer including a mat which spans the passage opening and overlaps with the support outside of the passage opening, and
   wherein at least one of the intermediate layer and the decorative layer is weakened at one and only one side of the passage opening along one edge of the passage opening.

2. The interior panelling part according to claim 1, wherein the side is orientated away from a window located nearest to the passage opening.

3. The interior panelling part according to claim 1, wherein the mat is mounted outside of the passage opening on at least one of (a) a further side of the passage opening which is situated opposite the side and (b) two further oppositely situated sides of the passage opening on the support.

4. The interior panelling part according to claim 1, wherein the intermediate layer comprises a foamed material which connects the decorative layer to the support and into which the mat is inserted.

5. The interior panelling part according to claim 1, wherein the mat is manufactured from one of polyester, polyamide, a synthetic material and a natural fibre material.

6. The interior panelling part according to claim 1, wherein the mat has at least one of a tensile strength of at least 1 MPa and a breaking elongation of at least 40%.

7. The interior panelling part according to claim 1, wherein a material which forms the mat has a modulus of elasticity of between 1 MPa and 5 MPa.

8. The interior panelling part according to claim 1, wherein the decorative layer contains at least one of PVC (polyvinyl chloride), TPU (thermoplastic polyurethane), TPO (thermoplastic polyolefin), leather and synthetic leather.

9. The interior panelling part according to claim 1, wherein the decorative layer has at least one of a tensile strength of at least 5 MPa and an extensibility of at least 250%.

10. The interior panelling part according to claim 1, wherein a material which forms the decorative layer has a modulus of elasticity of between 5 MPa and 15 MPa.

11. The interior panelling part according to claim 1, wherein the mat has a thickness of between 2 mm and 10 mm.

12. The interior panelling part according to claim 1, wherein the decorative layer a thickness of between 0.1 mm and 2.5 mm.

13. The interior panelling part according to claim 1, wherein the decorative layer with the intermediate layer forms a composite which has an extensibility of at least 40%.

14. The interior panelling part according to claim 1, wherein the decorative layer with the intermediate layer forms a composite which has a tensile strength of at least 2 Mpa.

15. A method for a production of an interior panelling part, comprising:
   introducing a decorative layer of the part and a flat support of the part, the part further comprising an intermediate layer which includes a mat;
   introducing the mat with a sealing layer which is placed behind it into a cavity between the decorative layer and the support such that the passage opening is covered; and
   after the introducing step, filling the cavity by rear-foaming of the decorative layer,
   wherein a passage opening is left open in the support, the mat spanning the passage opening and overlapping with the support outside of the passage opening, and
   wherein at least one of the intermediate layer and the decorative layer is weakened at one and only one side of the passage opening along one edge of the passage opening.

16. The method according to claim 15, wherein at least one the intermediate layer and the decorative layer is provided subsequently at precisely one side of the passage opening with a weak point which extends along the edge of the passage opening.

* * * * *